(12) United States Patent
Kim

(10) Patent No.: US 12,557,021 B2
(45) Date of Patent: Feb. 17, 2026

(54) EDGE COMPUTING ROUTER, AND OPERATION METHOD THEREOF

(71) Applicant: SK TELECOM CO., LTD., Seoul (KR)

(72) Inventor: Keun Hyun Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 375 days.

(21) Appl. No.: 18/025,467

(22) PCT Filed: Sep. 23, 2021

(86) PCT No.: PCT/KR2021/012957
§ 371 (c)(1),
(2) Date: Mar. 9, 2023

(87) PCT Pub. No.: WO2022/102950
PCT Pub. Date: May 19, 2022

(65) Prior Publication Data
US 2023/0345373 A1 Oct. 26, 2023

(30) Foreign Application Priority Data
Nov. 12, 2020 (KR) .................. 10-2020-0151084

(51) Int. Cl.
*H04W 52/02* (2009.01)
*H04W 68/02* (2009.01)
(52) U.S. Cl.
CPC ....... *H04W 52/0235* (2013.01); *H04W 68/02* (2013.01)

(58) Field of Classification Search
CPC ............. H04W 68/02; H04W 52/0235; H04W 72/04; H04W 56/00; H04W 52/02; H04W 52/0216; H04W 72/0493; H04W 56/004
See application file for complete search history.

(56) References Cited

U.S. PATENT DOCUMENTS

| 12,170,979 B2 * | 12/2024 | Choe ................ H04W 68/005 |
| 2019/0289569 A1 | 9/2019 | Frydman et al. |
| 2020/0007414 A1 | 1/2020 | Smith et al. |
| 2020/0404604 A1 * | 12/2020 | Hande ............... H04W 52/0216 |
| 2022/0345938 A1 * | 10/2022 | Gupta ................ H04W 28/065 |
| 2023/0389110 A1 * | 11/2023 | Zhang ................ H04W 76/20 |

(Continued)

FOREIGN PATENT DOCUMENTS

| CN | 110233815 | 7/2020 |
| KR | 10-0704679 | 4/2007 |
| KR | 10-2008-0096346 | 10/2008 |

(Continued)

OTHER PUBLICATIONS

Machine translation of KR100704679B1 (Year: 2007).*

(Continued)

*Primary Examiner* — Edan Orgad
(74) *Attorney, Agent, or Firm* — KED & ASSOCIATES, LLP

(57) ABSTRACT

The present disclosure relates to an edge computing router and an operating method of edge computing router for transmitting downlink traffic generated in an edge application to a terminal by controlling a paging procedure for the terminal in an idle state.

15 Claims, 5 Drawing Sheets

(56) References Cited

U.S. PATENT DOCUMENTS

2024/0137908 A1* 4/2024 Agiwal ................. H04W 68/02
2025/0063416 A1* 2/2025 Choi ................. H04W 52/0229

FOREIGN PATENT DOCUMENTS

| KR | 10-2020-0005507 | 1/2020 | | |
|----|-----------------|--------|---|---|
| KR | 10-2020-0109303 | 9/2020 | | |
| WO | WO-2020071880 A1 * | 4/2020 | ........ | H04W 52/0229 |
| WO | WO-2022053347 A1 * | 3/2022 | .......... | H04W 60/005 |

OTHER PUBLICATIONS

Machine translation of KR1020200005507 (Year: 2020).*
International Search Report dated Dec. 23, 2021 issued in Application No. PCT/KR2021/012957.
Giust, Fabio et al. MEC Deployments in 4G and Evolution Towards 5G. ETSI White Paper. No. 24, Feb. 2018.
Multi-access Edge Computing (MEC); MEC 5G Integration. ETSI GR MEC 031 V2.1.1. Oct. 2020.
Korean Notice of Allowance dated Jul. 8, 2024 issued in Application No. 10-2020-0151084.
Korean Office Action dated Nov. 19, 2023 issued in Application No. 10-2020-0151084.

* cited by examiner

EDGE COMPUTING ROUTER, AND OPERATION METHOD THEREOF

CROSS-REFERENCE TO RELATED PATENT APPLICATIONS

This application is a U.S. National Stage Application under 35 U.S.C. § 371 of PCT Application No. PCT/KR2021/012957, filed Sep. 23, 2021, which claims priority to Korean Patent Application No. 10-2020-0151084, filed Nov. 12, 2020, whose entire disclosures are hereby incorporated by reference.

TECHNICAL FIELD

The present disclosure relates to a mobile edge computing (MEC) technology and, more particularly, to a method for transmitting downlink traffic generated in an edge application to a terminal by controlling a paging procedure for the terminal in an idle state.

This application is based on and claims priority to Korean Patent Application No. 10-2020-0151084, filed on Nov. 12, 2020, in the Korean Intellectual Property Office, the disclosure of which is herein incorporated by reference in its entirety.

BACKGROUND ART

In an existing mobile communication network, all traffic generated in a terminal (e.g., a smartphone) is generally transmitted to a central SP-GW (SGW and PGW) for mobility management, billing, and the like.

In this centralized network structure, services, such as a call (IMS), Internet access, and messaging/video through various portals/OTTs, which are mostly used in terminals, are not very sensitive to a delay and have a low capacity of at most dozens of Mbps, and thus are used without any problem.

However, in recent years, a wide range of terminal devices from a conventional smartphone (human being) to objects including a car, a drone, a sensor, a VR headset, a camera, and a robot have been connected to a mobile communication network, and services required by each terminal device require a ultra-low latency (RTT) of a few ms to 10 ms and a high-capacity bandwidth from hundreds of Mbps to several Gbps per stream.

As a technology for meet these requirements, MEC capable of providing an edge computing service, which is an application service, in an edge cloud site (MEC site) close to a terminal is attracting attention.

In mobile edge computing, an edge application for an edge computing service may be installed in computing deployed in an edge cloud site, thereby providing an ultra-low latency and high-capacity edge computing service for a terminal connecting to the edge computing service through a base station.

In mobile edge computing, to provide an application service closer to the terminal, the edge cloud site where the edge application is installed is arranged in a network section between the base station and the core network, which is a back end of the base station.

However, a structure in which the edge cloud site is deployed at the back end of the base station enables a ultra-low latency service for uplink traffic generated from the terminal, but has a limitation of not being able to transmit downlink traffic generated in the edge application to the terminal when the terminal is in an idle state.

Accordingly, an embodiment of the present disclosure proposes a method for transmitting the downlink traffic generated in the edge application to the terminal in the idle state.

DISCLOSURE

Technical Problem

The present disclosure has been made in view of the above-mentioned circumstances, and an aspect of the present disclosure is to transmit downlink traffic generated in an edge application to a terminal by controlling a paging procedure for the terminal in an idle state.

Technical Solution

In view of the foregoing aspect, an edge computing router according to an embodiment of the present disclosure includes: an identification unit configured to identify whether a terminal is in an idle state according to generation of downlink traffic to be transmitted to the terminal in an edge application installed in an edge cloud site; and a controller configured to control a core network so that a paging procedure for the terminal to transition to an active state is performed to transmit the downlink traffic when the terminal is identified as being in the idle state.

Specifically, the identification unit may identify whether the terminal is in the idle state from a signaling message transmitted between a base station and the core network when the terminal enters the idle state, based on an arrangement characteristic of the edge cloud site deployed in line in a network connection section between the base station and the core network.

Specifically, the controller may control the core network receiving a wakeup message from a different edge computing router to perform the paging procedure for the terminal in association with the different edge computing router located in a separate edge cloud site deployed in at least one position of an inside of the core network and an outside of the core network.

Specifically, the controller may transmit connection information about the terminal to the different edge computing router so that the different edge computing router transmits the wakeup message generated using the connection information about the terminal as a destination address to the core network.

Specifically, the wakeup message may include a downlink message to be transmitted to the base station to which the terminal connects through the core network.

Specifically, the edge computing router may further include a forwarding unit configured to buffer the downlink traffic generated in the edge application when the terminal is identified as being in the idle state, and to transmit the buffered downlink traffic to the terminal when the terminal is identified as transitioning to the active state.

To achieve the foregoing aspect, an operating method of an edge computing router according to an embodiment of the present disclosure includes: an identification operation of identifying whether a terminal is in an idle state according to generation of downlink traffic to be transmitted to the terminal in an edge application installed in an edge cloud site; and a control operation of controlling a core network so that a paging procedure for the terminal to transition to an active state is performed to transmit the downlink traffic when the terminal is identified as being in the idle state.

Specifically, the identification operation may identify whether the terminal is in the idle state from a signaling message transmitted between a base station and the core network when the terminal enters the idle state, based on an arrangement characteristic of the edge cloud site deployed in line in a network connection section between the base station and the core network.

Specifically, the control operation may control the core network receiving a wakeup message from a different edge computing router to perform the paging procedure for the terminal in association with the different edge computing router located in a separate edge cloud site deployed in at least one position of an inside of the core network and an outside of the core network.

Specifically, the control operation may transmit connection information about the terminal to the different edge computing router so that the different edge computing router transmits the wakeup message generated using the connection information about the terminal as a destination address to the core network.

Specifically, the wakeup message may include a downlink message to be transmitted to the base station to which the terminal connects through the core network.

Specifically, the method may further include: a buffering operation of buffering the downlink traffic generated in the edge application when the terminal is identified as being in the idle state; and a transmission operation of transmitting the buffered downlink traffic to the terminal when the terminal is identified as transitioning to the active state.

Advantageous Effects

According to an edge computing router and an operating method of an edge computing router according to the present disclosure, an edge cloud site deployed in the network section between a base station and a core network transmits a wakeup message for a terminal to the core network in association with a separate edge cloud site deployed inside the core network or outside the core network (at the back end) to enable the terminal in an idle state to transition to an active state, making it possible to normally support an ultra-low latency service not only for uplink traffic generated in the terminal but also downlink traffic generated in the edge cloud site.

MODE FOR THE INVENTION

Hereinafter, exemplary embodiments of the present disclosure will be described with reference to the accompanying drawings.

An embodiment of the present disclosure relates to a mobile edge computing (MEC) technology for providing an edge computing service, which is an application service, from an edge cloud site (MEC site) closed to a terminal.

In mobile edge computing, an application for an edge computing service is installed in computing deployed in an edge cloud site, thereby providing an ultra-low latency and high-capacity edge computing service to a terminal connecting to the edge computing service through an access network.

In mobile edge computing, to provide an application service closer to the terminal, the edge cloud site in which the edge application is installed is deployed in a network section between a base station and a core network, which is a back end of the base station.

However, in a network structure in which the edge cloud site is deployed at the back end of the base station, an ultra-low latency service is possible for uplink traffic generated from the terminal, while a problem may occur in a process of transmitting downlink traffic generated in the edge application to the terminal.

That is, in an existing edge computing service environment, when the terminal receiving the downlink traffic is in an idle state at a time when the downlink traffic is generated in the edge application, the downlink traffic generated in the edge application may not be transmitted to the terminal until the terminal transitions to an active state.

In other words, due to the network structure in which the edge cloud site is deployed in the network section between the base station and the core network, the edge application installed in the edge cloud site may not autonomously support a paging procedure for the terminal in the idle state to transition to the active state, thus incurring a limitation of not being able to transmit the downlink traffic generated in the edge application to the terminal in the idle state.

Accordingly, an embodiment of the present disclosure is to propose a new method for normally transmitting downlink traffic generated in an edge application to a terminal in the idle state in view of the foregoing limitation.

Figure 1:
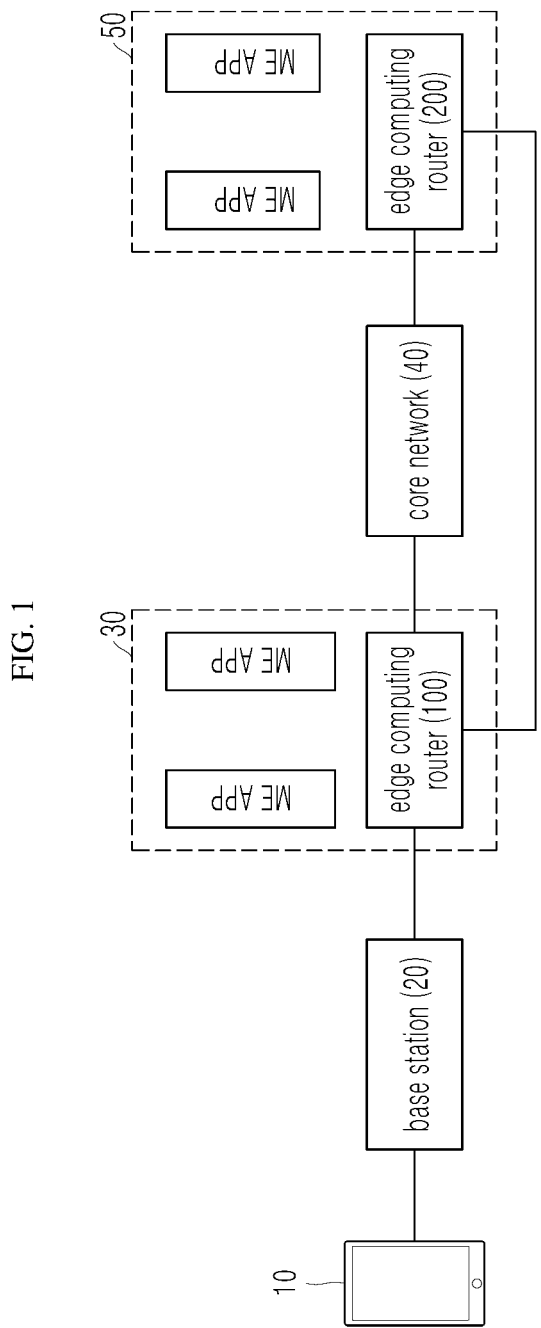
FIG. 1 illustrates an edge computing service environment according to an embodiment of the present disclosure.

FIG. 1 illustrates an edge computing service environment according to an embodiment of the present disclosure.

As illustrated in FIG. 1, the edge computing service environment according to the embodiment of the present disclosure may have a configuration including an edge cloud site 30 deployed in a network section between a base station 20 and a core network 40 (e.g., a 5G core) to provide an edge computing service near a terminal 10.

The edge computing service environment according to the embodiment of the present disclosure may further include a separate edge cloud site 50 deployed inside the core network 40 or outside the core network 40 (at a back end) in addition to the above configuration.

Hereinafter, for better understanding of a description, the edge cloud site 30 deployed in the network section between the base station 20 and the core network 40 (e.g., the 5G core) is referred to as a 'first edge cloud site', and the edge cloud site 50 deployed inside the core network 40 or outside the core network 40 (at the back end) is referred to as a 'second edge cloud site'.

An edge application (ME App) for an edge computing service may be installed in each of the first edge cloud site 30 and the second edge cloud site 50, and edge computing routers 100 and 200 for transmitting traffic for each edge application may be located in the respective sites.

Hereinafter, an edge computing router 100 located in the first edge cloud site 30 is referred to as a first edge computing router 100, and an edge computing router 200 located in the second edge cloud site 50 is referred to as a second edge computing router 200.

In the foregoing edge computing service environment according to the embodiment of the present disclosure, the foregoing configuration makes it possible to transmit downlink traffic generated in the edge application in the first edge cloud site 30 to the terminal 10 by controlling a paging procedure for the terminal 10 in the idle state. Hereinafter, the configuration of the first edge computing router 100 for realizing the foregoing is described in more detail.

Figure 2:
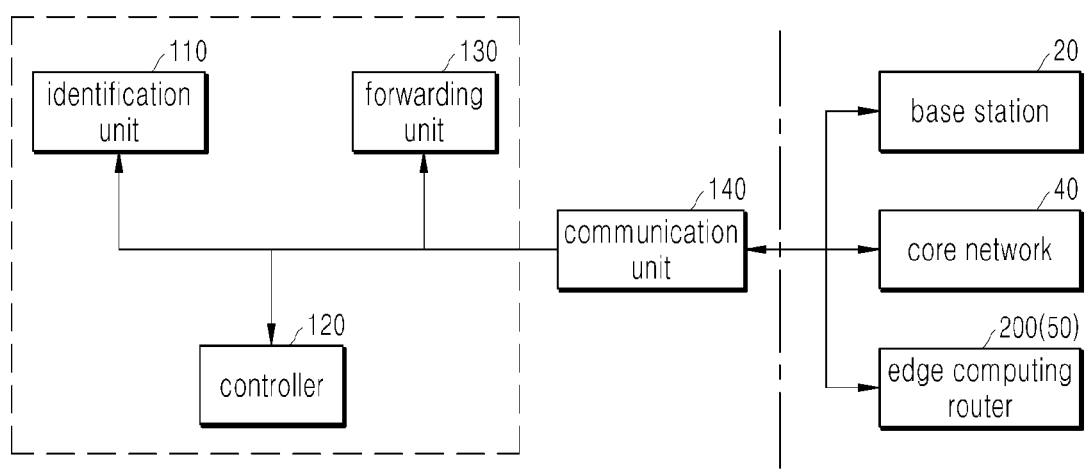
FIG. 2 is a schematic diagram illustrating the configuration of an edge computing router according to an embodiment of the present disclosure.

FIG. 2 is a schematic diagram illustrating the configuration of the first edge computing router 100 according to an embodiment of the present disclosure.

As illustrated in FIG. 2, the first edge computing router 100 according to the embodiment of the present disclosure may include an identification unit 110 to identify whether the terminal 10 is in an idle state and a controller 120 to control a paging procedure for the terminal 10.

The first edge computing router 100 according to the embodiment of the present disclosure may further include a forwarding unit 130 to transmit downlink traffic to the terminal 10.

The configuration of the first edge computing router 100 may be entirely or at least partly configured in the form of a hardware module, a software module, or a combination of a hardware module and a software module.

Here, the software module may be understood as an instruction executed by a processor for operational processing in the first edge computing router 100, and the instruction may be loaded in a separate memory in the first edge computing router 100.

In particular, the first edge computing router 100 according to the embodiment of the present disclosure may have a configuration further including a communication unit 140 in charge of a function of communication between the network section between the base station 20 and the core network 40 and the second edge computing router 200 of the second edge computing site 50 in addition to the foregoing components.

The communication unit 140 may include, for example, but not limited to, an antenna system, an RF transceiver, one or more amplifiers, a tuner, one or more oscillators, a digital signal processor, a codec chipset, and a memory, and may include any known circuit to perform these functions.

The first edge computing router 100 according to the embodiment of the present disclosure may control a paging procedure for the terminal 10 in the idle state through the foregoing configuration, thereby transmitting downlink traffic generated an edge application to the terminal 10. Hereinafter, each component in the first edge computing router 100 to realize the foregoing is described in more detail.

The identification unit 110 performs a function of identifying whether the terminal 10 is in the idle state.

Specifically, when downlink traffic to be transmitted to the terminal 10 is generated in the edge application installed in the first edge cloud site 30, the identification unit 110 identifies whether the terminal 10 is in the idle state.

To this end, the identification unit 110 uses an arrangement characteristic of the first edge cloud site 30 deployed in the network connection section between the base station 20 and the core network 40.

That is, the identification unit 110 monitors a signaling message transmitted in connection with the terminal 10 between the base station 20 and the core network 40, based on the arrangement characteristic of the first edge cloud site 30 deployed in line in the network connection section between the base station 20 and the core network 40.

Here, the identification unit 110 may monitor a signaling message regarding entry of the terminal 10 into the idle state from the signaling message transmitted between the base station 20 and the core network 40.

As it is possible to monitor the entry of the terminal 10 into the idle state in real time, the identification unit 110 may identify whether the state of the terminal 10 at a time when the downlink traffic is generated in the edge application is the idle state in which reception of the downlink traffic is impossible.

In summary, when the downlink traffic is generated in the edge application in a state in which the terminal 10 is monitored to enter the idle state from the signaling message transmitted between the base station 20 and the core network 40, the identification unit 110 may identify that the state of the terminal 10 at the time when the downlink traffic is generated is the idle state.

When the terminal 10 is identified as being in the idle state at the time when the downlink traffic is generated in the edge application, the forwarding unit 130 buffers the downlink traffic generated in the edge application.

Figure 3:
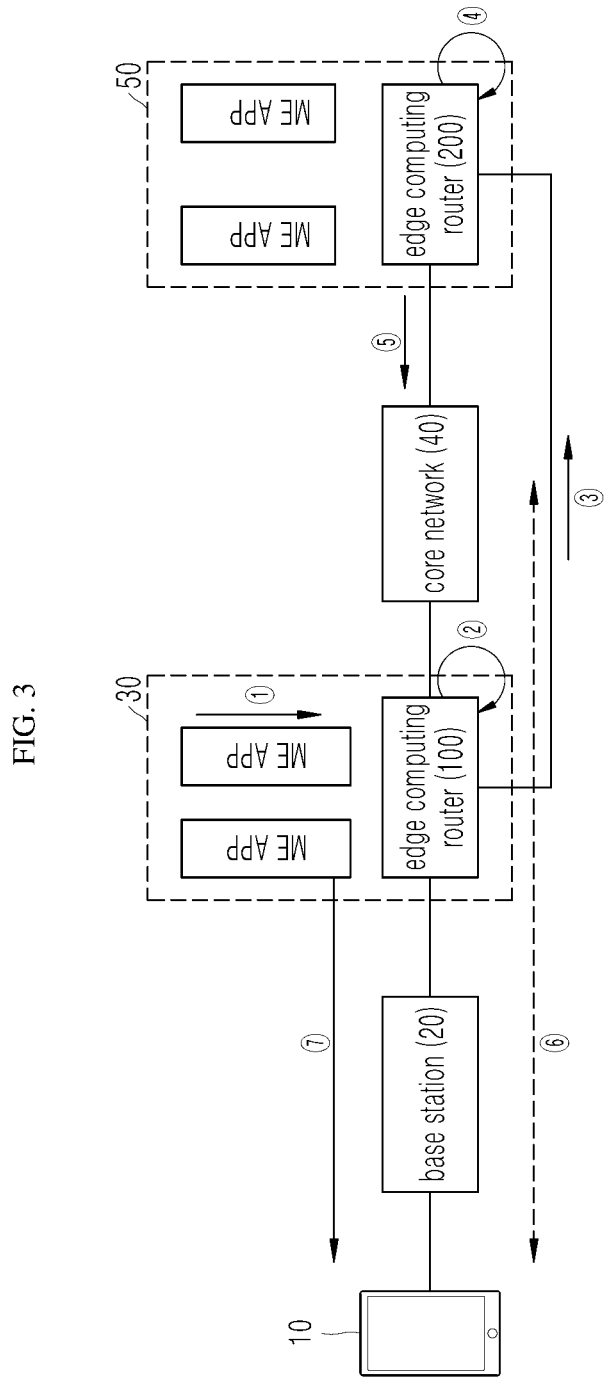
FIG. 3 illustrates control of a paging procedure according to an embodiment of the present disclosure.

This process may be understood, as illustrated in FIG. 3, as a process in which the first edge computing router 100 in the first edge cloud site 30 identifies the idle state of the terminal 10 and buffers the downlink traffic generated in the edge application (②) when the downlink traffic to be transmitted to the terminal 10 is generated in the edge application in the first edge cloud site 30 (①).

The controller 120 performs a function of controlling a paging procedure for the terminal 10.

Specifically, when the idle state of the terminal 10 is identified, the controller 120 performs a paging procedure for the terminal 10 to transition to the active state by controlling the core network 40 to transmit the downlink traffic.

The controller 120 may control the core network 40 through the second edge computing router 200 located in the second edge cloud site 50.

That is, the controller 120 controls the core network 40 to perform the paging procedure for the terminal 10 to transition to the active state through direct communication with the second edge computing router 200 deployed in at least one of the inside of the core network 40 and the outside of the core network 40.

In detail, when the idle state of the terminal 10 is identified, the controller 120 transmits connection information about the terminal 10 identified as being in the idle state to the edge computing router 200 through direct communication with the second edge computing router 200.

The second edge computing router 200 generates a wakeup message using the connection information about the terminal 10 as a destination address, and transmits the generated wakeup message to the core network 40, so that the core network 40 performs a paging procedure for the terminal 10 to transition to the active state.

The wakeup message may include a TCP message to be transmitted to the base station 20 to which the terminal 10 connects through the core network 40.

When receiving the wakeup message from the second edge computing router 200, the core network 40 performs the paging procedure for the terminal 10 according to the destination address in the received wakeup message, thus allowing the terminal 10 to transition from the idle state to the active state, in which reception of the downlink traffic is possible, in association with the base station 20.

In summary, when the state of the terminal 10 at the time when the downlink traffic is generated in the edge application is identified as the idle state in which the reception of the downlink traffic is impossible, the controller 120 may transmit the wakeup message using the connection information about the terminal 10 as the destination address to the core network 40 through direct communication with the second edge computing router 200, thereby controlling the core network 40 receiving the wakeup message to perform the paging procedure for the terminal 10 to transition to the active state.

This process may be understood, as illustrated in FIG. 3, as a process in which the first edge computing router 100 transmits the connection information about the terminal 10 to the second edge computing router 200 located in the second edge cloud site 50 (③), the second edge computing router 200 generates the wakeup message in which the received connection information about the terminal 10 is configured as the destination address and transmits the wakeup message to the core network 40 when receiving the connection information about the terminal 10 from the first edge computing router 100 (④ and ⑤), and accordingly the core network 40 performs the paging procedure for the terminal 10 according to the destination address in the wakeup message received from the first edge computing router 200 to allow the terminal 10 to transition from the idle state to the active state in which the reception of the downlink traffic is possible through the base station 20 (⑥).

The forwarding unit 130 performs a function of transmitting a downlink message.

Specifically, when transition of the terminal 10 to the active state is identified, the forwarding unit 130 transmits the downlink traffic generated in the edge application to the terminal 10.

The transition of the terminal 10 to the active state may be identified by the identification unit 110 monitoring a signaling message regarding transition of the terminal 10 to the active state transmitted between the base station 20 and the core network 40 according to the wakeup message.

To this end, as mentioned above, the forwarding unit 130 buffers the downlink traffic generated in the edge application in the idle state of the terminal 10.

When the terminal 10 is identified as having transitioned from the idle state to the active state, the forwarding unit 130 transmits the buffered downlink traffic to the terminal 10.

In the embodiment of the present disclosure, due to the above configuration of buffering the downlink traffic in the edge application until the terminal 10 transitions to the active state, even though the terminal 10 is in the idle state in which the reception of the downlink traffic is impossible at the time when the downlink traffic is generated in the edge application, it is possible to prevent the downlink traffic from being entirely lost.

This process may be understood, as illustrated in FIG. 3, as a process in which the edge computing router 100 in the first edge cloud site 30 transmits the buffered downlink traffic to the terminal 10 in the active state when identifying that the terminal 10 transitions to the active state by monitoring the signaling message regarding the transition of the terminal 10 to the active state transmitted between the base station 20 and the core network 40 (⑦).

As described above, according to the configuration of the first edge computing router 100 according to the embodiment of the present disclosure, the first edge cloud site 30 deployed in the network section between the base station 20 and the core network 40 transmits a wakeup message for the terminal 10 to the core network 40 in association with the second edge cloud site 50 separately deployed inside the core network 40 or outside the core network 40 (at the back end) to enable the terminal 10 in the idle state to transition to the active state, making it possible to normally support an ultra-low latency service not only for uplink traffic generated in the terminal 10 but also downlink traffic generated in the edge cloud site 30.

Figure 4:
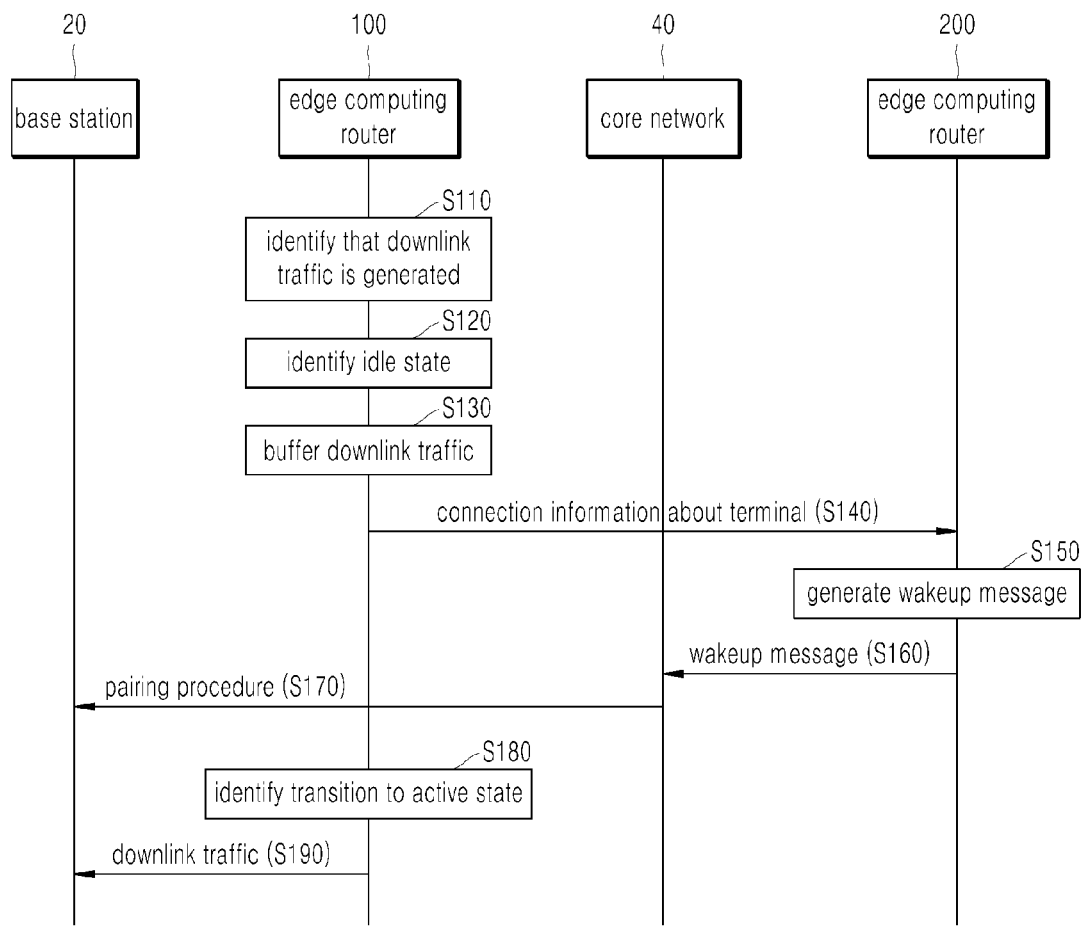
FIG. 4 is a schematic flowchart illustrating an operating method of each component involved in controlling a paging procedure in an edge computing service environment according to an embodiment of the present disclosure.

Hereinafter, an operating method of each component involved in controlling a paging procedure in the edge computing service environment according to an embodiment of the present disclosure is described with reference to FIG. 4.

First, when downlink traffic to be transmitted to the terminal 10 is generated in an edge application installed in the first edge cloud site 30, the first edge computing router 100 identifies whether the terminal 10 is in the idle state (S110 and S120).

The first edge computing router 100 monitors a signaling message transmitted in connection with the terminal 10 between the base station 20 and the core network 40, based on an arrangement characteristic of the first edge cloud site 30 deployed in line in the network connection section between the base station 20 and the core network 40, thereby identifying whether the state of the terminal 10 at a time when the downlink traffic is generated in the edge application is the idle state in which reception of the downlink traffic is impossible.

In other words, when the downlink traffic is generated in the edge application in a state in which the terminal 10 is monitored to enter the idle state from the signaling message transmitted between the base station 20 and the core network 40, the first edge computing router 100 may identify that the state of the terminal 10 at the time when the downlink traffic is generated is the idle state.

When the terminal 10 is identified as being in the idle state at the time when the downlink traffic is generated in the edge application, the first edge computing router 100 buffers the downlink traffic generated in the edge application (S130).

When the terminal 10 is identified as being in the idle state, the first edge computing router 100 transmits connection information about the terminal 10 identified as being in the idle state to the edge computing router 200 through direct communication with the second edge computing router 200 located in the second edge cloud site (S140).

The second edge computing router 200 generates a wakeup message using the connection information about the terminal 10 as a destination address, and transmits the generated wakeup message to the core network 40, so that the core network 40 performs a paging procedure for the terminal 10 to transition to the active state (S150 to S160).

The wakeup message may include a TCP message to be transmitted to the base station 20 to which the terminal 10 connects through the core network 40.

When receiving the wakeup message from the second edge computing router 200, the core network 40 performs the paging procedure for the terminal 10 according to the destination address in the received wakeup message, thus allowing the terminal 10 to transition from the idle state to the active state, in which reception of the downlink traffic is possible, in association with the base station 20 (S170).

In summary, when the state of the terminal 10 at the time when the downlink traffic is generated in the edge application is identified as the idle state in which the reception of the downlink traffic is impossible, the first edge computing router 100 may transmit the wakeup message using the connection information about the terminal 10 as the destination address to the core network 40 through direct communication with the second edge computing router 200, thereby controlling the core network 40 receiving the wakeup message to perform the paging procedure for the terminal 10 to transition to the active state.

When the terminal 10 is identified as having transitioned from the idle state to the active state, the first edge computing router 100 transmits the buffered downlink traffic to the terminal 10 (S180 and S190).

In the embodiment of the present disclosure, due to the above configuration of buffering the downlink traffic in the edge application until the terminal 10 transitions to the active state, even though the terminal 10 is in the idle state in which the reception of the downlink traffic is impossible at the time when the downlink traffic is generated in the edge application, it is possible to prevent the downlink traffic from being entirely lost.

Figure 5:
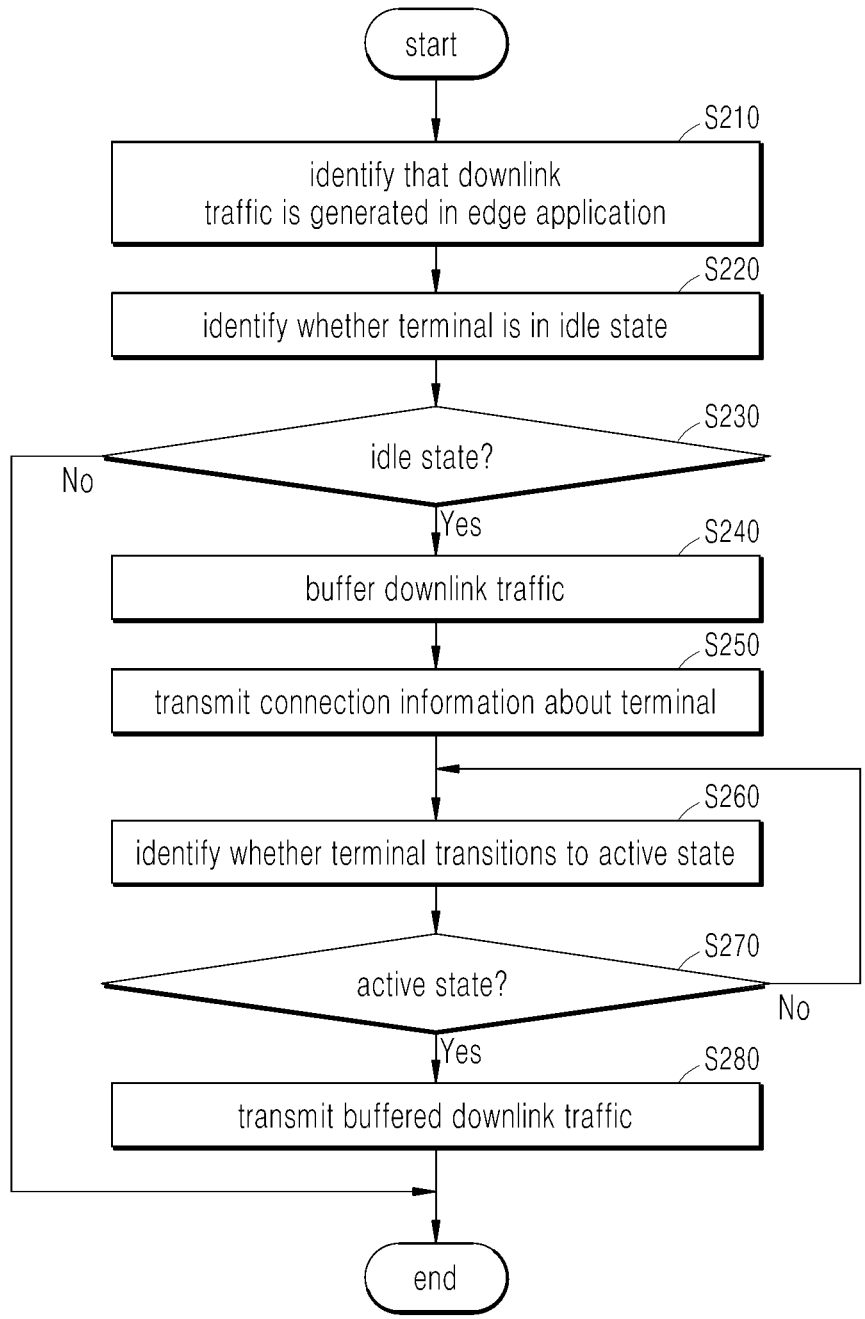
FIG. 5 is a schematic flowchart illustrating an operating method of an edge computing router according to an embodiment of the present disclosure.

Hereinafter, an operating method of the first edge computing router 100 according to an embodiment of the present disclosure is described with reference to FIG. 5.

First, when downlink traffic to be transmitted to the terminal 10 is generated in the edge application installed in the first edge cloud site 30, the identification unit 110 identifies whether the terminal 10 is in the idle state (S210 and S220).

To this end, the identification unit 110 uses an arrangement characteristic of the first edge cloud site 30 deployed in the network connection section between the base station 20 and the core network 40.

That is, the identification unit 110 monitors a signaling message transmitted in connection with the terminal 10 between the base station 20 and the core network 40, based on the arrangement characteristic of the first edge cloud site 30 deployed in line in the network connection section between the base station 20 and the core network 40.

Here, the identification unit 110 may monitor a signaling message regarding entry of the terminal 10 into the idle state from the signaling message transmitted between the base station 20 and the core network 40.

As it is possible to monitor the entry of the terminal 10 into the idle state in real time, the identification unit 110 may identify whether the state of the terminal 10 at a time when the downlink traffic is generated in the edge application is the idle state in which reception of the downlink traffic is impossible.

In summary, when the downlink traffic is generated in the edge application in a state in which the terminal 10 is monitored to enter the idle state from the signaling message transmitted between the base station 20 and the core network 40, the identification unit 110 may identify that the state of the terminal 10 at the time when the downlink traffic is generated is the idle state.

When the terminal 10 is identified as being in the idle state at the time when the downlink traffic is generated in the edge application, the forwarding unit 130 buffers the downlink traffic generated in the edge application (S230 and S240).

This process may be understood, as illustrated above in FIG. 3, as a process in which the first edge computing router 100 in the first edge cloud site 30 identifies the idle state of the terminal 10 and buffers the downlink traffic generated in the edge application (②) when the downlink traffic to be transmitted to the terminal 10 is generated in the edge application in the first edge cloud site 30 (①).

When the idle state of the terminal 10 is identified, the controller 120 performs a paging procedure for the terminal 10 to transition to the active state by controlling the core network 40 to transmit the downlink traffic (S250).

The controller 120 may control the core network 40 through the second edge computing router 200 located in the second edge cloud site 50.

That is, the controller 120 controls the core network 40 to perform the paging procedure for the terminal 10 to transition to the active state through direct communication with the second edge computing router 200 deployed in at least one of the inside of the core network 40 and the outside of the core network 40.

In detail, when the idle state of the terminal 10 is identified, the controller 120 transmits connection information about the terminal 10 identified as being in the idle state to the edge computing router 200 through direct communication with the second edge computing router 200.

The second edge computing router 200 generates a wakeup message using the connection information about the terminal 10 as a destination address, and transmits the generated wakeup message to the core network 40, so that the core network 40 performs a paging procedure for the terminal 10 to transition to the active state.

The wakeup message may include a TCP message to be transmitted to the base station 20 to which the terminal 10 connects through the core network 40.

When receiving the wakeup message from the second edge computing router 200, the core network 40 performs the paging procedure for the terminal 10 according to the destination address in the received wakeup message, thus allowing the terminal 10 to transition from the idle state to the active state, in which reception of the downlink traffic is possible, in association with the base station 20.

In summary, when the state of the terminal 10 at the time when the downlink traffic is generated in the edge application is identified as the idle state in which the reception of the downlink traffic is impossible, the controller 120 may transmit the wakeup message using the connection information about the terminal 10 as the destination address to the core network 40 through direct communication with the second edge computing router 200, thereby controlling the core network 40 receiving the wakeup message to perform the paging procedure for the terminal 10 to transition to the active state.

This process may be understood, as illustrated above in FIG. 3, as a process in which the first edge computing router 100 transmits the connection information about the terminal 10 to the second edge computing router 200 located in the second edge cloud site 50 (③), the second edge computing router 200 generates the wakeup message in which the received connection information about the terminal 10 is configured as the destination address and transmits the wakeup message to the core network 40 when receiving the connection information about the terminal 10 from the first edge computing router 100 (④ and ⑤), and accordingly the core network 40 performs the paging procedure for the terminal 10 according to the destination address in the wakeup message received from the first edge computing router 200 to allow the terminal 10 to transition from the idle state to the active state in which the reception of the downlink traffic is possible through the base station 20 (⑥).

When transition of the terminal 10 to the active state is identified, the forwarding unit 130 transmits the downlink traffic generated in the edge application to the terminal 10 (S260 to S280).

The transition of the terminal 10 to the active state may be identified by the identification unit 110 monitoring a signaling message regarding transition of the terminal 10 to the active state transmitted between the base station 20 and the core network 40 according to the wakeup message.

To this end, as mentioned above in operation S240, the forwarding unit 130 buffers the downlink traffic generated in the edge application in the idle state of the terminal 10.

When the terminal 10 is identified as having transitioned from the idle state to the active state, the forwarding unit 130 transmits the buffered downlink traffic to the terminal 10.

In the embodiment of the present disclosure, due to the above configuration of buffering the downlink traffic in the edge application until the terminal 10 transitions to the active state, even though the terminal 10 is in the idle state in which the reception of the downlink traffic is impossible at the time when the downlink traffic is generated in the edge application, it is possible to prevent the downlink traffic from being entirely lost.

This process may be understood, as illustrated above in FIG. 3, as a process in which the edge computing router 100 in the first edge cloud site 30 transmits the buffered downlink traffic to the terminal 10 in the active state when identifying that the terminal 10 transitions to the active state by monitoring the signaling message regarding the transition of the terminal 10 to the active state transmitted between the base station 20 and the core network 40 (⑦).

As described above, according to the operating method of each component in the edge computing service environment according to the embodiment of the present disclosure, the first edge cloud site 30 deployed in the network section between the base station 20 and the core network 40 transmits a wakeup message for the terminal 10 to the core network 40 in association with the second edge cloud site 50 separately deployed inside the core network 40 or outside the core network 40 (at the back end) to enable the terminal 10 in the idle state to transition to the active state, making it possible to normally support an ultra-low latency service not only for uplink traffic generated in the terminal 10 but also downlink traffic generated in the edge cloud site 30.

The operating methods according to the embodiments of the present disclosure may be configured in the form of program instructions that can be executed through various computer devices and may be recorded in a computer-readable medium. The computer-readable medium may include a program instruction, a data file, a data structure, and the like alone or in combination. The program instruction recorded in the medium may be specially designed and configured for the present disclosure, or may be known and available to those skilled in computer software. Examples of the computer-readable recording medium include magnetic media, such as a hard disk, a floppy disk, and a magnetic tape, optical media, such as a CD-ROM and a DVD, magneto-optical media, such as a floptical disk, and a hardware device specially configured to store and perform a program instruction, such as a ROM, a RAM, and a flash memory. Examples of the program instruction include not only a machine code made by a compiler but also a high-level language code executable by a computer using an interpreter. The hardware device may be configured to operate as one or more software modules to perform an operation of the present disclosure, and vice versa.

Although the present disclosure has been described in detail with reference to the exemplary embodiments, the present disclosure is not limited to these embodiments, and various changes and modifications may be made by those skilled in the art to which the present disclosure belongs without departing from the gist of the present disclosure claimed in the following claims.

The invention claimed is:

1. An edge computing router comprising:
an identification unit configured to identify whether a terminal is in an idle state according to generation of downlink traffic to be transmitted to the terminal in an edge application installed in an edge cloud site; and
a controller configured to control a core network so that a paging procedure for the terminal to transition to an active state is performed to transmit the downlink traffic when the terminal is identified as being in the idle state,
wherein the controller is configured to control the core network receiving a wakeup message from another edge computing router to perform the paging procedure for the terminal in association with the other edge computing router located in another edge cloud site deployed in at least one of an inside of the core network or an outside of the core network.

2. The edge computing router of claim 1, wherein the identification unit is configured to identify whether the terminal is in the idle state from a signaling message transmitted between a base station and the core network when the terminal enters the idle state, based on an arrangement characteristic of the edge cloud site arranged in line in a network connection section between the base station and the core network.

3. The edge computing router of claim 1, wherein the controller is configured to transmit connection information of the terminal to the other edge computing router to enable the other edge computing router to transmit the wakeup message generated using the connection information of the terminal as a destination address to the core network.

4. The edge computing router of claim 1, wherein the wakeup message comprises a downlink message to be transmitted to the base station to which the terminal connects through the core network.

5. The edge computing router of claim 1, further comprising a forwarding unit configured to buffer the downlink traffic generated in the edge application when the terminal is identified to be in the idle state, and to transmit the buffered downlink traffic to the terminal when the terminal is identified to transition to the active state.

6. An operating method of an edge computing router, the method comprising:
identifying whether a terminal is in an idle state according to generation of downlink traffic to be transmitted to the terminal in an edge application installed in an edge cloud site; and
controlling a core network so that a paging procedure for the terminal to transition to an active state is performed to transmit the downlink traffic when the terminal is identified as being in the idle state,
wherein controlling the core network comprises controlling the core network receiving a wakeup message from another edge computing router to perform the paging procedure for the terminal in association with the other edge computing router located in another edge cloud site deployed in at least one of an inside of the core network or an outside of the core network.

7. The method of claim 6, wherein identifying whether the terminal is in the idle state comprises identifying whether the terminal is in the idle state from a signaling message transmitted between a base station and the core network when the terminal enters the idle state, based on an arrangement characteristic of the edge cloud site arranged in line in a network connection section between the base station and the core network.

8. The method of claim 6, wherein controlling the core network comprises transmitting connection information of the terminal to the other edge computing router to enable the other edge computing router to transmit the wakeup message generated using the connection information of the terminal as a destination address to the core network.

9. The method of claim 6, wherein the wakeup message comprises a downlink message to be transmitted to the base station to which the terminal connects through the core network.

10. The method of claim 6, further comprising:
buffering the downlink traffic generated in the edge application when the terminal is identified to be in the idle state; and
transmitting the buffered downlink traffic to the terminal when the terminal is identified to transition to the active state.

11. An edge computing router comprising:
a non-transitory computer readable medium to store one or more instructions; and
a processor that implements the one or more instructions to:
identify whether a terminal is in an idle state according to generation of downlink traffic to be transmitted to the terminal in an edge application installed in an edge cloud site; and
control a core network so that a paging procedure for the terminal to transition to an active state is performed to transmit the downlink traffic when the terminal is identified as being in the idle state,
wherein the one or more instructions cause the processor to control the core network when receiving a wakeup message from another edge computing router to perform the paging procedure for the terminal in association with the other edge computing router located in another edge cloud site deployed in at least one of an inside of the core network or an outside of the core network.

12. The edge computing router of claim 11, wherein the one or more instructions cause the processor to identify whether the terminal is in the idle state from a signaling message transmitted between a base station and the core network when the terminal enters the idle state, based on an arrangement characteristic of the edge cloud site arranged in line in a network connection section between the base station and the core network.

13. The edge computing router of claim 11, wherein the one or more instructions cause the processor to transmit connection information of the terminal to the other edge computing router to enable the other edge computing router to transmit the wakeup message generated using the connection information of the terminal as a destination address to the core network.

14. The edge computing router of claim 11, wherein the wakeup message comprises a downlink message to be transmitted to the base station to which the terminal connects through the core network.

15. The edge computing router of claim 11, wherein the one or more instructions cause the processor to:
buffer the downlink traffic generated in the edge application when the terminal is identified to be in the idle state, and
transmit the buffered downlink traffic to the terminal when the terminal is identified to transition to the active state.

* * * * *